C. DUDLEY.
SNAP-HOOK.

No. 171,361.  Patented Dec. 21, 1875.

UNITED STATES PATENT OFFICE.

CHARLES DUDLEY, OF NEW HAVEN, CONNECTICUT, ASSIGNOR TO
O. B. NORTH & CO., OF SAME PLACE.

IMPROVEMENT IN SNAP-HOOKS.

Specification forming part of Letters Patent No. 171,361, dated December 21, 1875; application filed November 23, 1875.

*To all whom it may concern:*

Be it known that I, CHARLES DUDLEY, of New Haven, in the county of New Haven and State of Connecticut, have invented a new Improvement in Snap-Hooks; and I do hereby declare the following, when taken in connection with the accompanying drawings and the letters of reference marked thereon, to be a full, clear, and exact description of the same, and which said drawings constitute part of this specification, and represent, in—

Figure 1:
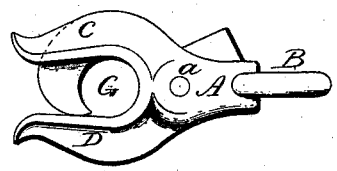
Figure 2:
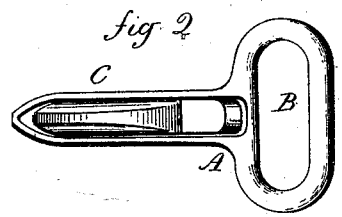
Figure 3:
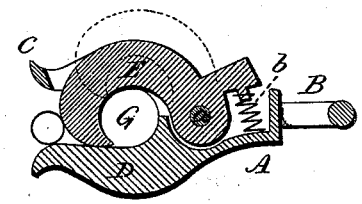
Figure 4:
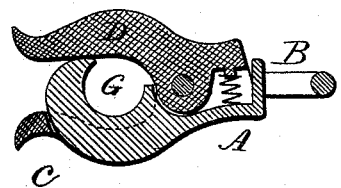

Figure 1, side view; Fig. 2, plan view; Fig. 3, longitudinal section; Fig. 4, modification.

This invention relates to an improvement in that class of snap-hooks in which one part is pivoted to the other, and a spring between the two tends to hold the two parts in a closed position, the object of this invention being to construct the hook so as to be readily engaged, and by no possibility can it be accidentally disengaged; and the invention consists, first, in constructing one of the parts with its forward end curved inward toward the pivot, and so as to form a hook upon the inside, and similarly curved or inclined upon the outside inward, so that by simply pressing the hook longitudinally onto the thing to which it is to be engaged, the hook will automatically open, and the subsequent draft or strain coming upon the inner or hook surface will tend only to hold the hook in a closed position; and, secondly, in the construction of a guard to further prevent accidental opening, all as more fully hereinafter described.

A is the shank of the hook, terminating in a loop, B, or other convenient device for attaching the hook. Forward the body extends in two divisions, C D, forming a U-shaped mouth, as seen in Fig. 1. One of these sides C is open in the plane of the body, and within this opening the hook E is pivoted at *a*, as seen in Fig. 3. The forward end of the hook E lies within the mouth of the body, and upon the inner side curves back toward the pivot, so as to form a hook shape, and rest upon the opposite side D of the body, and form an opening, G, within which the thing engaged will rest. Outside, the hook E is correspondingly curved, or so as to form a surface inclined to the side D of the body. In rear of the pivot a suitable spring, *b*, is arranged, the tendency of which is to hold the hook end down upon the side or opposing surface D.

When it is desired to engage the hook it is only necessary to place the mouth of the body against the thing to which it is to be engaged, as seen in Fig. 3, and press longitudinally on the hook. The part E is in consequence of its inclined forward end automatically turned, so as to allow it to pass over the said thing, and then the reaction of the spring closes the part E.

In consequence of the inward curve or hook shape of the end of the part E, any strain brings the hook hard upon the thing with which it is engaged, and without the slightest tendency to open, but, on the contrary, increasing the force, which holds it in its closed position.

While the second or open part C of the body is desirable as a guard to prevent the possibility of disengagement, or to take the transverse strain from the hook, it may be dispensed with, it being only essential that there be an opposing surface to the hook G.

Thus far the hook part E has been represented as pivoted to the body; but, if preferred, this may be formed on the body with the loop, and the parts C and D pivoted to the body, as shown in Fig. 4, and in that case, if desirable, the part C may be dispensed with. In either case the same peculiar hook is retained in the same relative position to the opposing surface, so that longitudinal force causes the automatic opening of the hook.

I claim—

1. The combination, in a snap-hook, of the two parts D E, pivoted together, one forming a hook, the other an opposing surface, the one inclined inward upon its outer surface toward the other; one of the parts constructed with a loop or other means of attachment, and combined with a spring operating to close the two parts together, substantially as described.

2. In a snap-hook, the two sides C D, forming the U-shaped mouth, one of the sides open in the plane of the body, combined with a second part pivoted to the first within the said open side, and so as to lie against the other as the opposing surface, the said second part curved inward toward the pivot to form a hook shape, substantially as described.

CHARLES DUDLEY.

Witnesses:
J. H. SHUMWAY,
CLARA BROUGHTON.